United States Patent [19]

Engstrom

[11] Patent Number: 4,858,266
[45] Date of Patent: Aug. 22, 1989

[54] BICYCLE TOOL

[75] Inventor: Arthur B. Engstrom, Maplewood, Minn.

[73] Assignee: Bicycle Tools, Incorporated, St. Paul, Minn.

[21] Appl. No.: 200,545

[22] Filed: May 31, 1988

[51] Int. Cl.$^4$ .............................................. A47L 13/06
[52] U.S. Cl. ................................. 15/111; 15/236.07; 15/236.08; D4/118
[58] Field of Search ............ 15/105, 111, 160, 236.07, 15/236.08, 256.6; D4/118; D32/40, 46–48; 132/309

[56] References Cited

U.S. PATENT DOCUMENTS

| D. 100,390 | 7/1936 | Robison, Jr. | 15/236.07 X |
|---|---|---|---|
| 1,645,101 | 10/1927 | Gibb et al. | 15/236.08 X |
| 1,658,706 | 2/1928 | Carrott | 15/111 X |
| 3,036,322 | 5/1962 | Jorgensen | 15/236.08 X |

OTHER PUBLICATIONS

Advertisement entitled: "Floss Your Bike"; Author–Cyclean, 3236 Cherryridge Road, Englewood, CO 80110; ad appeared in Mar. 1988 issue of Bicycling magazine, p. 23.

Brochure entitled "Maintain Your Train"; Author–Allsop, Inc. P.O. Box 23, Bellingham, WA 98227–undated brochure.

*Primary Examiner*—Peter Feldman
*Attorney, Agent, or Firm*—Palmatier & Sjoquist

[57] ABSTRACT

The present invention is a bicycle cleaning tool having a rigid bar, a flexible toothed tapered curved prong with a pointed end, and a brush with a curved brush face. The rigid bar knocks clumps of dirt from a bicycle component. The toothed prong pries into generally inaccessible areas to bite into and dig out dirt. The brush end brushes away minute particles and conforms to a number of curved surfaces on a bicycle.

8 Claims, 2 Drawing Sheets

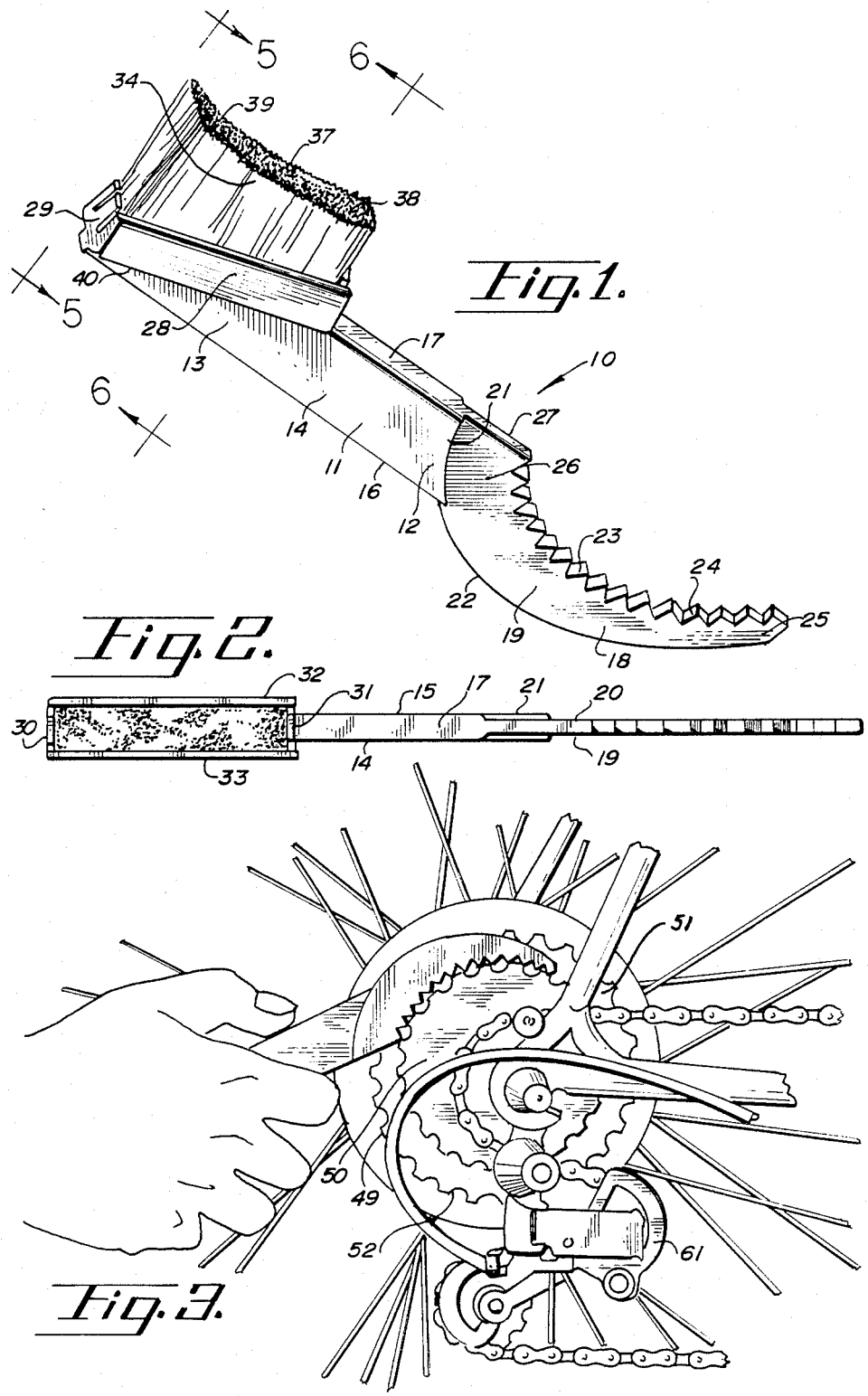

BICYCLE TOOL

BACKGROUND OF THE INVENTION

1. Field of the Invention

The present invention relates to bicycle tools and more particularly to bicycle cleaning tools.

2. Description of the Prior Art

A bicycle by its very nature collects dirt. The various components of a bicycle that are susceptible to dirt include the free wheel, the front and rear derailleurs, idler and jockey wheels, the chain, sprockets, chain rings, caliper rings, hubs, rims, peddles, and the tire tread. In particular, dirt and grit may hinder the chain from riding directly on the sprockets, thereby increasing the chances for chain slippage.

A bicycle is susceptible to dirt regardless of the type of biking pursued. An urban bicyclist encounters the dirt produced by cars, trucks, buses and other city vehicles. An over-the-road bicyclist, biking daily for months on end, pursues his sport through rain or snow and gravel roads. A triathlete may compete at distances up to 150 miles and may train over 500 miles a week, constantly punishing his bike. Mountain bicyclists or dirt bike competitors, maneuvering their bikes up and down steep inclines, depend on their bike's components to operate on boulders, gravel, and dirt. Even a training bike for a young child is susceptible to dirt.

A bicyclist is his or her own power source. Therefore, he or she restricts the weight of the gear to be carried. Moreover, the bicyclist prefers compact gear because of the limited areas to which gear can be affixed to a bicycle.

SUMMARY OF THE INVENTION

A feature of the present invention is a bicycle tool having a removable brush with a curved face. The brush is affixed to one end of a rigid bar.

A curved notched prong extends from an opposite end of the rigid bar. The curved prong conforms to a component of the bicycle such as individual cogs of the free wheel. The notches or teeth are disposed on a concave edge of the curved prong to bite into dirt adhering to the free wheel or other component of the bike.

The toothed prong tapers from the rigid bar to form a distal pointed end. While the notches are disposed on the concave edge of the prong, a convex edge of the prong is smooth to allow penetration of the prong into a bicycle.

The notched prong of the bicycle tool is flexible, resilient, and somewhat narrow. A brush receptacle affixing the brush to the bar is rigid and has a greater thickness than the narrow, notched prong.

The brush receptacle includes a pair of ledges extending from a pair of side faces of the rigid bar. The ledges form a base for clamps for the brush and are useful for scraping dirt from the bike.

In operation, if the free wheel is to be cleaned, the curved notched prong is placed over or between the individual cogs of the free wheel. The free wheel is then rotated by spinning the rear wheel or rotating the peddles. The notches or teeth may displace a majority of the dirt clinging to or between the individual cogs. After the dirt has been displaced or loosened, the brush is placed over or between the cogs to further displace dirt therefrom. Since the brush has a greater thickness than the notched prong, the brush may overlap into an adjacent cog, thereby contacting more surfaces within the free wheel than the notched end.

In other operations, the prong may be inserted into areas inaccessible to fingers. The rigid bar and brush receptacle may be utilized to knock hard clumps of dirt from the frame or other bicycle components. The ledges or base of the brush receptacle may be used to scrap mud or dirt from the bicycle or components thereof.

An advantage of the present invention is a bicycle tool having a number of cleaning features.

Another advantage of the present invention is that the cleaning tool is light in mass and compact. The tool readily fits within a bicycle bag connected to the handle bars.

Still another advantage of the present invention is the structure and disposition of the notches on the curved prong. The sharp, pointed notches or teeth dislodge the bulk of the dirt about the free wheel. The degree of curvature of the curved prong corresponds to the sprocket having the largest radius, but the pointed teeth are sufficiently small in size so that the curved prong operates on the smaller sprockets.

Still another advantage of the present invention is that the thicker brush may complete the cleaning of the free wheel after the narrow prong has been utilized and displace the dirt particulates that would otherwise serve as foundations on which even more dirt would cling.

Still another advantage of the present invention is that the tapered prong penetrates into generally inaccessible areas of the bicycle.

Still another advantage of the present invention is that the rigid bar and rigid brush receptacle may be utilized to knock clumps of dirt from the frame and wheels.

Still another advantage of the present invention is that the teeth and brush extend in the same direction from the rigid bar. Hence, when utilizing the brush, the teeth form a gripping handle for the fingers of a hand while the thumb presses on an edge of the rigid bar to bring pressure to bear on the brush. Conversely, when using the tooth prong, the brush forms a comfortable handle for the fingers or palm of the hand while the thumb presses on the edge of the rigid bar to bring pressure to bear on the teeth.

Still another advantage of the present invention is that the face of the brush is curved so that the brush conforms to curvature of various bicycle components.

Still another advantage of the present invention is that the brush is removable from its brush receptacle to allow its replacement with a new brush or a brush having a different face configuration for cleaning different components of the bicycle.

Still another advantage of the present invention is that the brush receptacle has a set of four inwardly biased clamps. Although the brush is removable, it is sufficiently secure in the brush receptacle so that the brush remains secure even when bicycle components are rotating at high speeds.

BRIEF DESCRIPTION OF THE DRAWINGS

FIG. 1 shows a perspective view of the bicycle cleaning tool.

FIG. 2 is a bottom plan view of the tool shown in FIG. 1.

FIG. 3 is a partial elevational view of the rear sprockets of a bicycle and the tool shown in FIG. 1.

DETAILED DESCRIPTION OF THE PREFERRED EMBODIMENT

Figure 4:
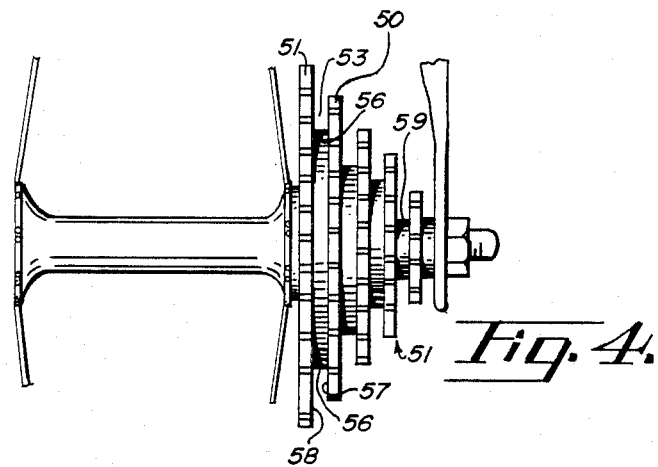
FIG. 4 is a rear view of the sprockets shown in FIG. 3.
Figure 5:
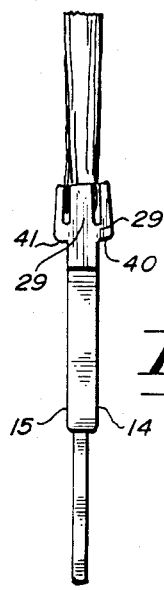
FIG. 5 is an end plan view of the tool from lines 5—5 of FIG. 1.
Figure 6:
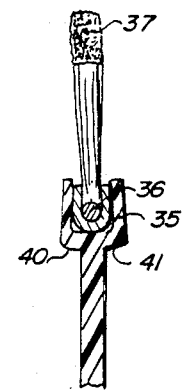
FIG. 6 is a sectional view of the tool at lines 6—6 of FIG. 1.

As shown in FIGS. 1 and 2, a plastic bicycle cleaning tool 10 has a rigid, elongate bar 11 with a pair of opposing, respective prong and brush bar ends 12 and 13. The bar 11 has a pair of opposing, planar, bar side faces 14 and 15 substantially parallel to each other and a pair of opposing, respective long and short, substantially parallel, linear, bar edges 16 and 17.

A curved, tapering, toothed prong 18 is integrally connected to the prong end 12 of the bar 11. The prong 18 has a pair of substantially parallel, planar side faces 19 and 20. The distance between the prong faces 19 and 20 is less than the distance between the bar side faces 14 and 15 so that the prong 18 is narrower and more flexible than the rigid and thicker bar 11. A curved ridge 21 is formed where the prong 18 is integrally connected to end 12 of bar 11.

The prong 18 has a pair of respective convex and concave, tapering edges 22 and 23 tapering away from bar end 12. Convex edge 22 is smooth. Concave edge 23 has a plurality of sharp, pointed teeth 24 tapering away from smooth edge 22. The tapering edges 22 and 23 form a distal pointed end 25 for penetrating into and prying dirt from generally inaccessible areas of a bicycle. A proximal prong end 26 forms a flat prong edge 27 lying flush with and substantially parallel to bar edge 17. The distal pointed end 25 lies substantially in line with edges 17 and 27. The prong 18 curves so as to form an arc on the side or edge 16 of bar 11.

As shown in FIGS. 1, 2, 5, and 6, a brush receptacle 28 is integrally connected obliquely to brush end 13. The receptacle 28 is disposed obliquely with respect to bar edges 16 and 17 so that long bar edge 16 has a greater length than short bar edge 17. The brush receptacle 28 has a base 29 and a set of four clamp extensions 30, 31, 32, and 33 integrally connected to and extending from the base 29. Opposing and longitudinally spaced clamp extensions 30 and 31 have a thickness similar to the thickness of the rigid bar 11 of the width of the bar edge 17. Opposing, elongate clamp extensions 32 and 33 are disposed between clamp extensions 30 and 31 and are biased inwardly and toward each other.

A brush 34 is clamped in brush receptacle 28 by clamp extensions 32 and 33. Clamp extensions 30 and 31 limit longitudinal movement of the brush 34. The individual bristles of the brush 34 are clinched by a brush clasp 35. The bristles of the brush 34 are wrapped about a shaft 36 inside the clasp 35. Clasp 35 and brush 34 are removably clamped in brush receptacle 28. The brush 34 and teeth 24 extend in the same direction from rigid bar 11.

Brush 34 has a curved brush face 37 with a proximal brush end 38 and a distal brush end 39. The curved brush face 37 has a decreasing slope from the distal end 39 to the proximal end 38. The changing curvature of the brush face 37 allows the brush 34 to conform to a variety of surfaces on a bicycle. The thickness of the brush face 34 is greater than the thickness of prong 18 or distance between prong faces 19 and 20.

The thickness of the base 29 is greater than the thickness of rigid bar 11 to form a pair of ledges 40 and 41 extending from the respective faces 14 and 15. The ledges 40 and 41 are disposed obliquely in relation to the parallel bar edges 16 and 17. The ledges 40 and 41 cooperate with edge 16 to scrape dirt and grit from surfaces of a bicycle. The ledges 40 and 41 and edge 16 apply different angular forces on a given clump of dirt to readily scrape especially hardened dirt from a bicycle surface.

Figure 7:
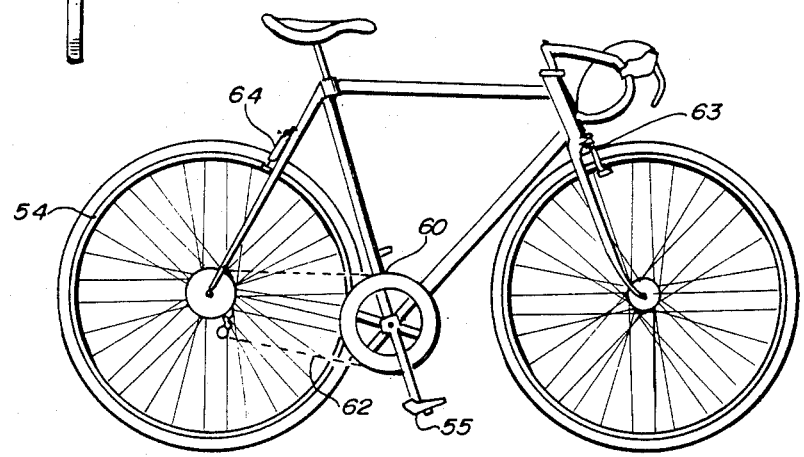
FIG. 7 is an elevational view of a bicycle.

The cleaning tool 10 performs a number of cleaning operations on a bicycle. For example, as shown in FIGS. 3, 4, and 7, the toothed prong 18 not only fits over a cog 50 of a freewheel 49, but also slides readily between the individual cog 50 and a second cog 51. When placed over a cog 50 or 51, the teeth 24 of the prong 18 bite into and dig out dirt on top of and between the teeth 52 of the cog 50. When placed into a space 53 formed by cogs 50 and 51, the teeth 24 dig out and bite into dirt and grit caught in space 53. To facilitate cleaning of the freewheel 49, the rear wheel 54 or the pedals 55 may be rotated to thereby rotate the freewheel 49 and cogs 50 and 51 while the cleaning tool 10 is held stationary. This operation continues until the teeth 24 contact and clean dirt from a ratchet cover 56.

After the teeth 24 have contacted the ratchet cover 56 and dug out as much dirt as possible from between the cogs 50 and 51, the brush 34 is utilized. The thickness of the brush face 37 is greater than the thickness of the toothed prong 18 and may be greater than the lateral distance of space 53 between cogs 50 and 51 to brush a maximum surface area of the freewheel 49. For instance, since the thickness of brush face 37 is typically greater than the lateral distance of space 53 between cogs 50 and 51, a pair of opposing inner faces 57 and 58 of cogs 50 and 51 are cleaned simultaneously as the freewheel 49 is rotated. Moreover, individual bristles of the brush 34 may be bent over and thereby clean teeth 52 of the cogs 50 and 51 as the freewheel 49 is rotated.

The slope of the curved brush face 37 changes from the distal brush end 39 to the proximal brush end 38. The difference in curvature allows the brush face 37 to conform not only to the curved ratchet cover 56 but also for instance a curved ratchet cover 59 of a lesser diameter.

The distal pointed end 25 of the flexible prong 18 is utilized to pry dirt from generally inaccessible areas such as into a front derailleur 60, a rear derailleur 61 and the chain 62. The tapered smooth edge 22 allows an easy entry and exit into the generally inaccessible areas.

The rigid bar 11 is utilized to knock clumps of dirt and small stones from the components of a bicycle such as a front caliper brake 63 and a rear caliper brake 64. The rigid bar 11 may also knock dirt from the cleats of a bicycle shoe. The tool 10 may be grasped around the toothed prong 18 for the knocking operation since the teeth 24, although pointed, provide a sufficient surface area so as to not pierce one's skin.

I claim:

1. A bicycle cleaning tool for cleaning a bicycle and the components thereof, the bicycle being susceptible to the collection of extraneous material such as dirt and grit, comprising
   an elongate bar having a prong end and a brush end,
   a prong integrally connected to said prong end of said bar and having a pair of convex and concave opposing edges, said concave edge including a plurality of projecting teeth having sharp points for biting into and digging out dirt and grit from a bicycle, said prong being curved and tapering away from said prong end of said bar so that said prong and teeth conform to curved bicycle components for penetrating into and prying dirt from generally inaccessible areas of a bicycle, and a brush removably affixed to said brush end of said bar, said brush being disposed obliquely in relation to said bar, said brush brushing dirt and grit from a bicycle, whereby after said prong digs out dirt and grit from a bicycle component, said brush brushes the dirt and grit from the bicycle component.

2. The tool of claim 1, wherein said prong and said teeth are narrower than said brush so that said brush contacts a greater area on a bicycle component than said prong and teeth.

3. The tool of claim 1, wherein said prong is more flexible than said bar so that said prong is pliable to enter generally inaccessible areas of a bicycle and pry dirt and grit therefrom, said bar being rigid to knock dirt from a bicycle.

4. The tool of claim 1, wherein said brush end includes a set of integrally connected clamp extensions, said extensions projecting outwardly from said bar and being biased inwardly to thereby clamp said brush between said clamp extensions.

5. The tool of claim 1, wherein said bar includes a substantially straight edge and a ledge extending outwardly from said bar, said ledge disposed obliquely in relation to said straight edge of said bar so that said ledge and said straight edge cooperate to scrape dirt and grit from the surfaces of a bicycle.

6. The tool of claim 1, wherein said brush has a curved face, said face having a distal end and a proximal end, said curved face having a slope decreasing from said distal end to said proximal end.

7. The tool of claim 1, wherein said teeth and brush extend in the same direction from said bar.

8. A bicycle cleaning tool for cleaning a bicycle and the components thereof, the bicycle tool being susceptible to the collection of extraneous material such as dirt and grit, comprising a rigid, elongate bar having a prong end and a brush end, a pair of opposing planar bar side faces, and a pair of short and long parallel bar edges, said prong end being curved and said bar being rigid to knock dirt from bicycle components, a prong integrally connected to said prong end of said rigid bar and having a pair of convex and concave tapering edges and a pair of opposing planar prong side faces, said concave tapering edge including a plurality of teeth extending therefrom for biting into and digging out dirt and grit from a bicycle, said bar side faces being in different planes than said prong side faces so that said rigid bar has a greater thickness than said prong, a curved ridge being formed at said prong end where said prong is integrally connected to said rigid bar, said convex and concave tapering edges being curved to conform to curved bicycle components, said convex and concave tapering edges tapering away from said prong end of said rigid bar to form a distal pointed end for penetrating into and prying dirt from generally inaccessible areas of a bicycle, said convex tapering edge being smooth, said prong being more flexible than said rigid bar to be pliable to enter generally inaccessible areas of a bicycle, said distal pointed end being substantially in line with said short parallel bar edge, and a brush receptacle integrally connected to said brush end of said rigid bar, said brush receptacle being disposed obliquely in relation to said short and long parallel bar edges, said brush receptacle including a base, a pair of elongate clamp extensions, and a pair of longitudinally spaced clamp extensions, said extensions integrally connected to said base, said elongate extensions being inwardly projecting and biased toward each other, said longitudinally spaced extensions being disposed between said elongate extensions, said elongate extensions removably clamping a brush therebetween and in said brush receptacle to allow a different brush to be connected therein, said longitudinally spaced extensions preventing longitudinal movement of said brush, said brush having a curved face to conform to curved surfaces on a bicycle, said curved face having a distal brush end and a proximal brush end, said curved face having a decreasing slope from said distal end to said proximal end, said base of said brush receptacle having a thickness greater than said thickness of said rigid bar, said base forming a ledge disposed obliquely in relation to said long parallel bar edge so that said long parallel bar edge and said ledge cooperate to scrape dirt and grit from the surface of a bicycle, said brush having a greater thickness than said prong and said teeth so that said brush contacts a greater area on a bicycle component than said prong and teeth, whereby after said prong digs out dirt and grit from a bicycle component, said brush brushes the dirt and grit from the bicycle component.

* * * * *